Feb. 26, 1957

A. C. ALLEN 2,782,641

BALANCING APPARATUS

Filed June 1, 1951

Inventor:
Arthur C. Allen
By Ahlberg, Kupper & Gradolph
Attorneys.

Feb. 26, 1957 A. C. ALLEN 2,782,641
BALANCING APPARATUS
Filed June 1, 1951 5 Sheets-Sheet 3

Inventor:
Arthur C. Allen
By Ahlberg, Hupper & Gradolph
Attorneys.

Feb. 26, 1957　　　A. C. ALLEN　　　2,782,641
BALANCING APPARATUS
Filed June 1, 1951　　　　　　　　　　5 Sheets-Sheet 5

Inventor:
Arthur C. Allen
By Ahlberg, Wupper & Gradolph
Attorneys.

United States Patent Office 2,782,641
Patented Feb. 26, 1957

2,782,641

BALANCING APPARATUS

Arthur C. Allen, Chicago, Ill., assignor to Stewart-Warner Corporation, Chicago, Ill., a corporation of Virginia Application June 1, 1951, Serial No. 229,351

14 Claims. (Cl. 73—457)

This invention relates to apparatus for determining unbalance in a vehicle support wheel without removing the wheel from the vehicle.

One object of the invention is to provide improved apparatus of the above character which is not only exceptionally easy and convenient to use but also inherently capable of detecting unbalance in a mounted vehicle support wheel with supreme fidelity and dependability.

A more specific object is to provide for determining unbalance in a mounted vehicle support wheel improved apparatus which affords great accuracy and dependability in operation by responding with precision to vibrational forces or stresses applied by an unbalanced rotating wheel to structure of the apparatus which supports the wheel through the axle on which it is mounted.

A further object is to provide unbalance determining apparatus as recited in the previous object which obtains extraordinary operational accuracy by responding to vibrational stresses on wheel support structure having rigidity that not only obviates resonant vibration of the rotating wheel during an unbalance determining operation but restrains vibrational movement of the wheel to avoid operational inaccuracies from such movement.

Another object is to provide highly sensitive unbalance determining apparatus of the above character which inherently assures accurate responses to extremely slight vibrational forces of structure that requires very strong vertical support during an unbalance determining operation.

Further objects, advantages and features of the invention will appear from the following description of an illustrative wheel balancer constructed in accordance with the invention, the description being taken with reference to the accompanying drawings, in which.

Figures 1, 3:
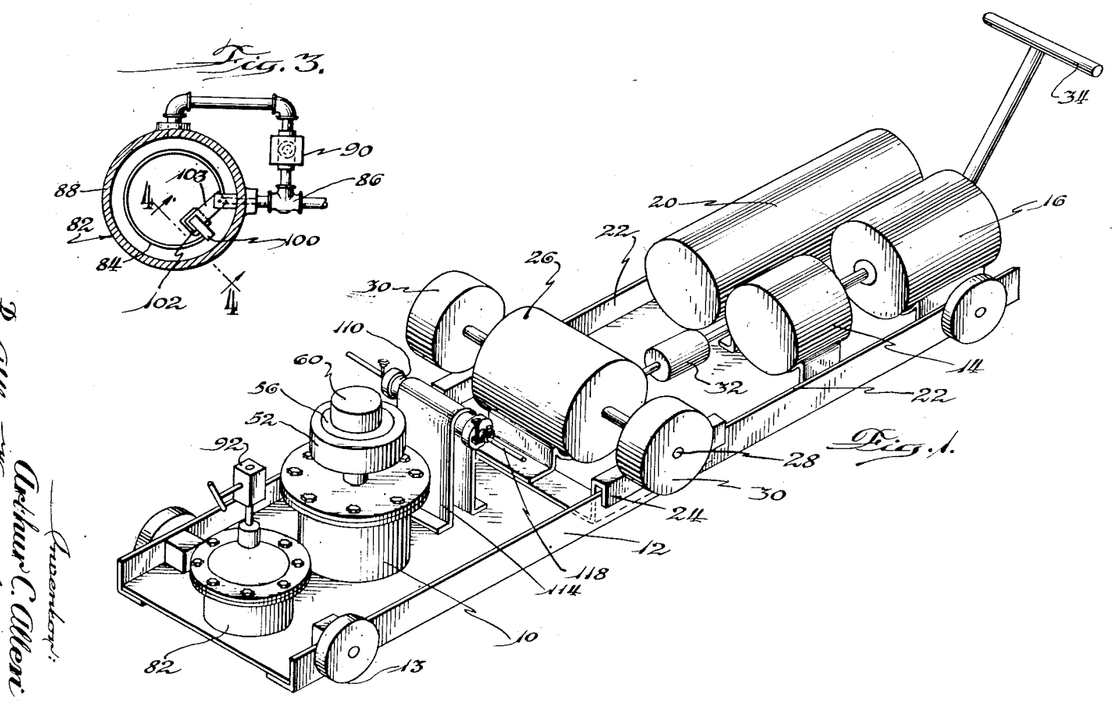
Fig. 1 is a perspective view of a unit including a jack, a vibration pickup, a wheel spinner, and other auxiliary apparatus.
Fig. 3 is a fragmentary plan sectional view, taken as indicated by the line 3—3 in Fig. 2 of a portion of the vibration pickup arrangement.

The balancing apparatus shown in Fig. 1 includes wheel lifting means including a hydraulic jack 10 which is mounted near the forward end of a low cart 12 having wheels 13. The jack 10 may be operated by means of a hydraulic pressure pump 14 which is driven by an electric motor 16. A tank 20 provides a reserve supply of hydraulic fluid for the pump.

The cart 12 has a pair of upwardly extending rails or flanges 22 along its longitudinal edges. A wheel-spinning assembly 24 is slidable along the rail 22. The wheel spinner 24 includes an electric motor 26 having a shaft 28 extending from both ends of the motor. A pair of drive pulleys 30 are mounted on the ends of the shaft 28. The electric motor 26 may also include an electrically operable brake for applying a braking torque to the shaft 28. This braking effect may be obtained by supplying current in a reverse direction to the field of the motor, or, as diagrammatically illustrated in Fig. 11, a resistance 31 may be connected across the terminals of the motor 26 when the control switch therefor is opened. The resistor then operates to dissipate the electrical energy generated by the motor as it coasts to a stop. A hydraulic cylinder 32 is provided for moving the wheel spinner 24 back and forth along the rails 22. The cart 12 has a short handle 34 for maneuvering the cart into place underneath a vehicle.

Figures 2, 11:
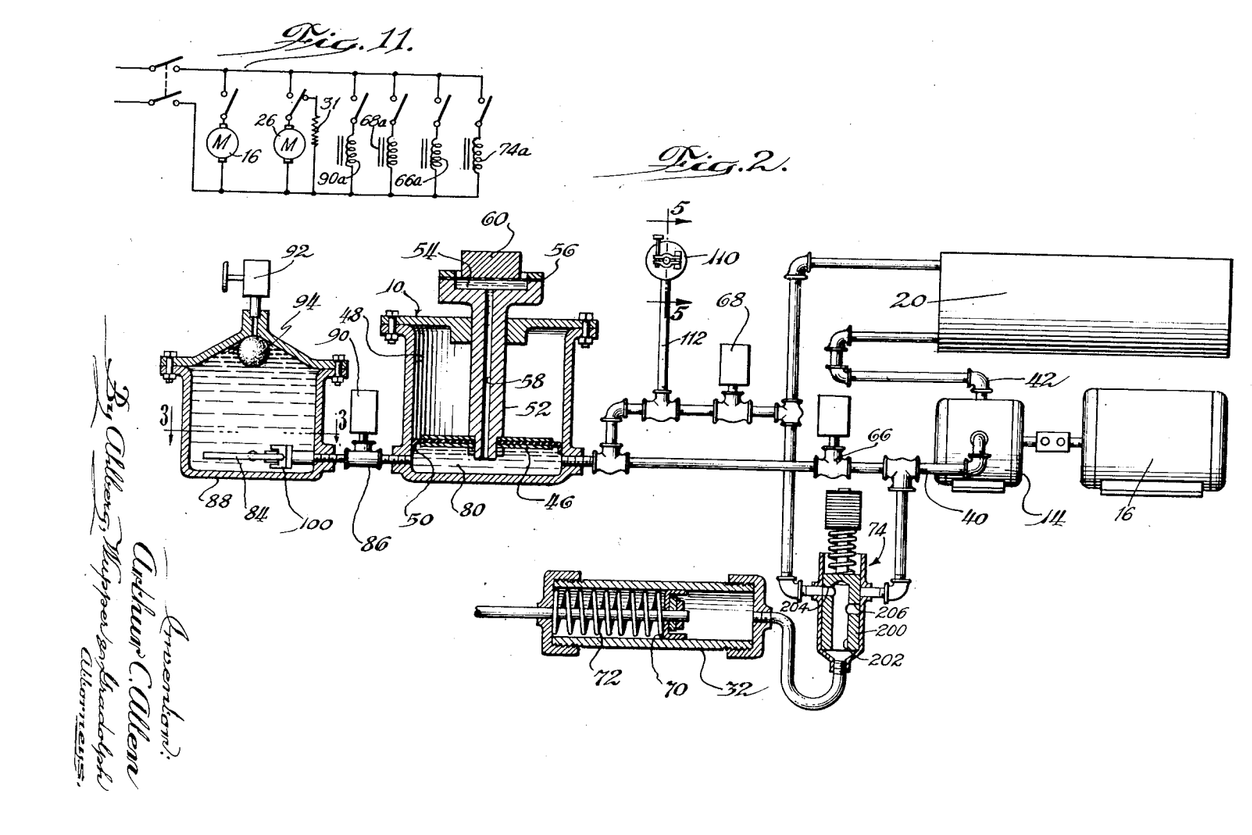
Fig. 2 is a diagrammatic, partly sectional, elevational view of the unit of Fig. 1 illustrating particularly the jack, the vibration pickup, and means for moving the wheel spinner.
Fig. 11 is a schematic wiring diagram of the electrical portions of the apparatus.

As shown in Fig. 2, the pump 14 has an outlet pipe 40 together with an inlet pipe 42 which is connected to the tank 20. The pump 14 may be provided with internal means such as a relief valve for limiting the maximum pressure which the pump develops.

The hydraulic jack 10 includes a piston 46 which is reciprocable in a jacking chamber or cylinder 48. The piston 46 includes a soft flexible packing disc 50 to prevent leakage of hydraulic fluid between the piston and the piston cylinder 48.

The jack 10 includes a jacking shaft 52 which has a cylindrical cavity 54 at its upper end, the cavity being closed by a resilient diaphragm 56 to form a sensory fluid cell. The jack shaft 52 has an axial bore to convey hydraulic fluid into the cavity 54 from the space below the piston 46. A cylindrical load-supporting head 60 is secured to the upper side of the diaphragm 56.

The portion of the cylinder 48 below the piston 46 communicates with the outlet 40 of the pump 14 through a solenoid-operated valve 66. The cylinder 48 is connected with the tank 20 through a solenoid-operated venting valve 68.

The hydraulic cylinder 32 has a piston 70. A helical return spring 72 urges the piston 70 in a direction to move the wheel spinner 24 away from the hydraulic jack 10 (Fig. 1). A solenoid operated valve 74 is provided to connect the hydraulic cylinder 32 either to the outlet of the pump 14 or to the tank 20. As shown schematically, the valve 74 comprises a cylindrical plunger 200 slidably mounted in the valve casing. A downwardly open axial bore 202 in the plunger 200 communicates with the conduit leading to the spinner actuator cylinder 32. Two bores 204, 206 axially spaced along the plunger 200 extend laterally from the axial bore 202 to opposite sides of the plunger. The plunger 200 is spring-biased to a lower position in which the conduit from the cylinder 32 is connected through the bores 202 and 204 to the return line from the valve. The solenoid actuator for the valve serves to shift the plunger 200 to a second position in which the spinner cylinder 32 is connected through the bores 202 and 206 with the fluid supply line from the pump 14.

Hydraulic fluid 80 fills the hydraulic system, including the portion of the cylinder 48 below the piston 46.

The wheel balancer includes a vibration pickup assembly 82 for producing electrical signals in response to pressure variations in the hydraulic fluid 80. The pickup assembly includes a pressure sensitive device such as a generally circular Bourdon tube 84 having one end connected to the cylinder 48 by a conduit 86. The other end of the Bourdon tube 84 is closed. The Bourdon tube is housed in a plenum chamber formed by a closed container 88. A solenoid-operated valve 90 connects the interior of the container 88 through conduit 86 with the portion of the cylinder 48 below the piston 46 (see Fig. 3).

An air-bleeding valve 92 provides a passage from the upper end of the container 88 to the atmosphere. A hollow, flexible air-filled ball 94 is positioned in the container 88 to provide an air space having a predetermined volume. The ball 94 may be made of synthetic rubber.

Figure 4:
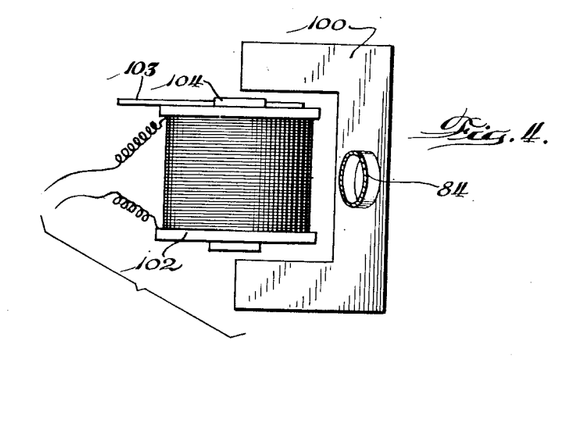
Fig. 4 is a fragmentary elevational sectional view, taken as indicated by the line 4—4 in Fig. 3, of a portion of the pickup.

In order to provide electrical signals corresponding to the deflections of the Bourdon tube 84, a permanent magnet 100 (Fig. 4) is mounted on the closed free end of the Bourdon tube. A pickup coil 102 is fixedly mounted adjacent the U-shaped permanent magnet 100 by a bracket 103. The coil 102 has a magnetically permeable core 104 extending between the poles of the magnet 100. The ends of the core 104 are spaced from the poles of the magnet so that the magnet can vibrate freely with respect to the core.

Figure 5:
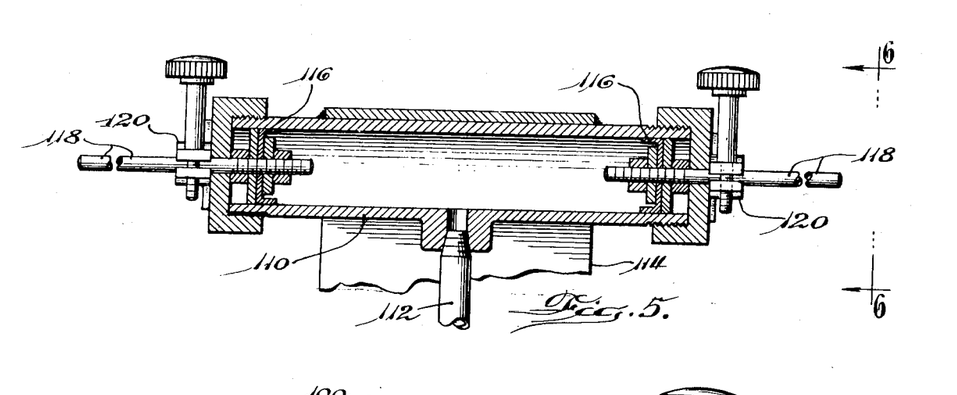
Fig. 5 is a fragmentary elevational sectional view, taken as indicated by the line 5—5 in Fig. 2, of an arrangement to detect horizontally directed vibrations.

A small horizontally disposed cylinder 110 is positioned between the hydraulic jack 10 and the spinner 24 for detecting horizontally directed vibrations of the vehicle wheel. The interior of the cylinder 110 is connected with the portion of the cylinder 48 below the piston 46 by means of a conduit 112. The cylinder 110 is mounted on the cart 12 by means of a U-shaped bracket 114.

Figure 6:
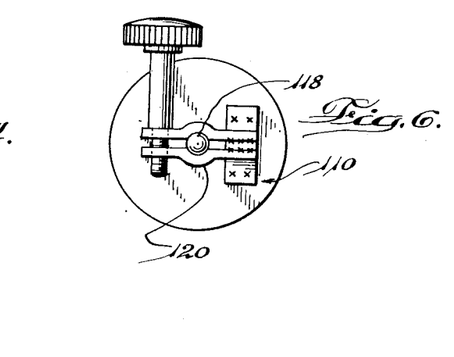
Fig. 6 is a fragmentary elevational view taken as indicated by the line 6—6 of Fig. 5.

A pair of pistons 116 are slidable in the opposite ends of the cylinder 110 and define with the latter a second sensory cell. Each of the pistons has an outwardly extending piston rod 118 for engaging the brake-backing disc of the vehicle wheel. Pinch clamps 120 (Fig. 6) are provided to lock the piston rods 118.

The wheel balancer includes rotary unbalance orientation means comprising an electrical generator 130 (Fig. 8) for providing electrical signals corresponding to the rotational position of the rotatable body. The generator 130 has a rotor 131 including a shaft 132 which carries a two-pole rotatable permanent field magnet 134.

Figure 7:
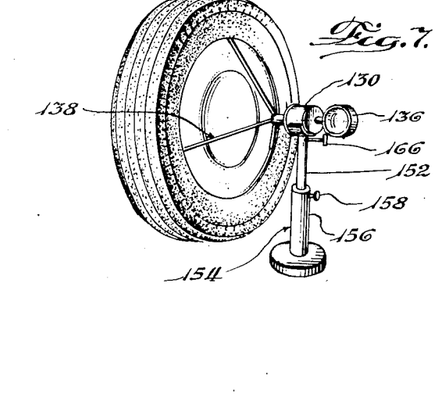
Fig. 7 is a perspective view of an arrangement to produce a signal corresponding to rotation of a vehicle wheel.

A tachometer 136 is driven by the shaft 132. A lightweight tripod 138 is mounted on the front end of the shaft 132 to provide a driving connection with a vehicle wheel. The tripod includes three tubular arms 140 having their inner ends pivotally connected to a hub 142. Any suitable spring clip or screw clamp may be employed to secure the outer ends of the arms 140 to the rim of a vehicle wheel at intervals of 120 degrees, as indicated in Fig. 7.

Figure 8:
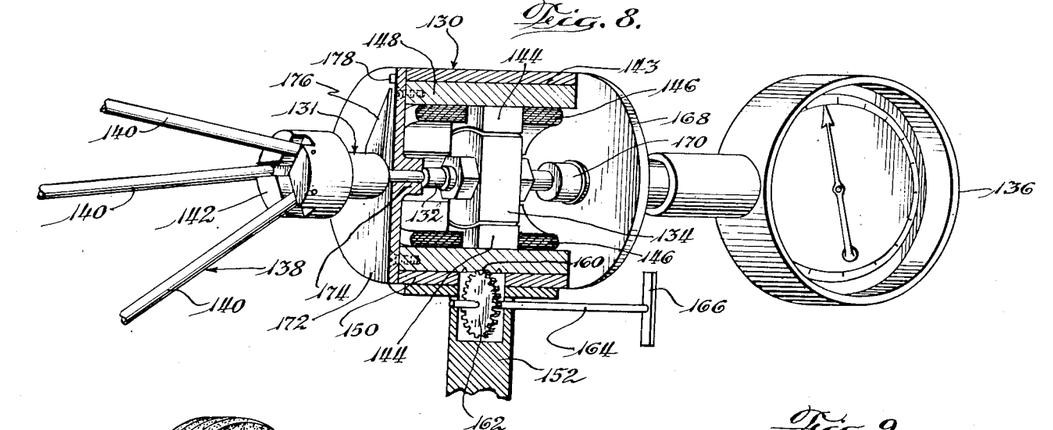
Fig. 8 is a fragmentary partly sectional perspective view of the apparatus of Fig. 7.

The generator 130 includes a stator or armature 143 having a pair of diametrically opposite armature poles 144. Armature coils 146 are mounted on the poles. The poles 144 and the coils 146 are carried on the inside of a cylindrical ring 148 in order to provide a rotatable mounting for the stator. The armature mounting ring 148 is rotatably carried inside a cylindrical housing 150 which is rigidly mounted on an extensible arm 152 forming a part of an adjustable stand 154. The stand 154 includes a lower tubular section 156 into which the arm 152 telescopes. A thumb screw 158 provides means for locking the arm 152 in an extended position.

The outer surface of the armature supporting ring 148 is provided with gear teeth 160 which engage with a pinion 162 mounted inside the upper end of the arm 152. The pinion 162 is provided with a shaft 164 having a handle 166 which may be rotated to turn the armature mounting ring 148. The rear end of the housing 150 is closed by an end plate 168 which supports a bearing 170 in which the shaft 132 is journaled.

A front end plate 172 is secured to the armature mounting ring 148. The front plate 172 carries a second bearing 174 which rotatably supports the shaft 132.

A pointer 176 mounted on the shaft 132 cooperates with an index mark 178 on the armature end plate 172 to indicate the relative position of the field magnet 134 and the armature poles 144. The mark 178 may be positioned so that the pointer 176 registers with the mark when the field magnet 134 is aligned with the armature poles.

Figure 9:
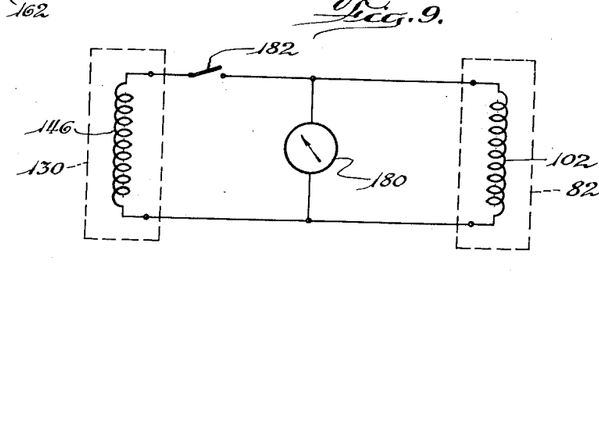
Fig. 9 is a diagram of a circuit for combining and comparing a rotation signal and a vibrational signal.

As shown in Fig. 9, the wheel balancer includes an alternating current milliammeter 180 for measuring the output currents from the generator 130 and the vibration pickup 82. The meter 180 may be of the rectifier type. The coil 102 of the vibration pickup is connected in series with the meter 180. A switch 182 is connected in series with the generator winding 146 and the series circuit of the switch and the winding is connected in series with meter 180. In Fig. 11 the actuating coils of the solenoids are indicated by the reference character of the solenoid, followed by the letter "a."

Operation

Before the wheel balancer is put into operation, the jack rod 52 is lowered so that the cart 12 can be moved underneath the axle assembly of the vehicle. To lower the jack rod 52, the solenoid valve 68 is opened so that hydraulic fluid in the jack cylinder 48 can escape into the tank 20. Air should be removed from the container 82 by opening the bleed valve 92 until a small amount of hydraulic fluid escapes. During this operation, the solenoid valve 90 should be open. The bleed valve 92 is closed during normal operation.

Two pistons 116 and pulleys 30 are provided so that the wheel balancer may readily be used for balancing either left-hand or right-hand vehicle wheels. Consequently, one of the piston rods 118 may be pushed inwardly and locked by means of its clamp 120 during the entire balancing operation. The other rod 118 should be pushed inwardly and locked during an initial stage of the balancing operation. Initially the two-way valve 74 is operated so that the spinner-advancing piston cylinder 32 is vented to the tank 20. The wheel spinner 24 is then held in its retracted position by the force of the spring 72.

Figure 10:
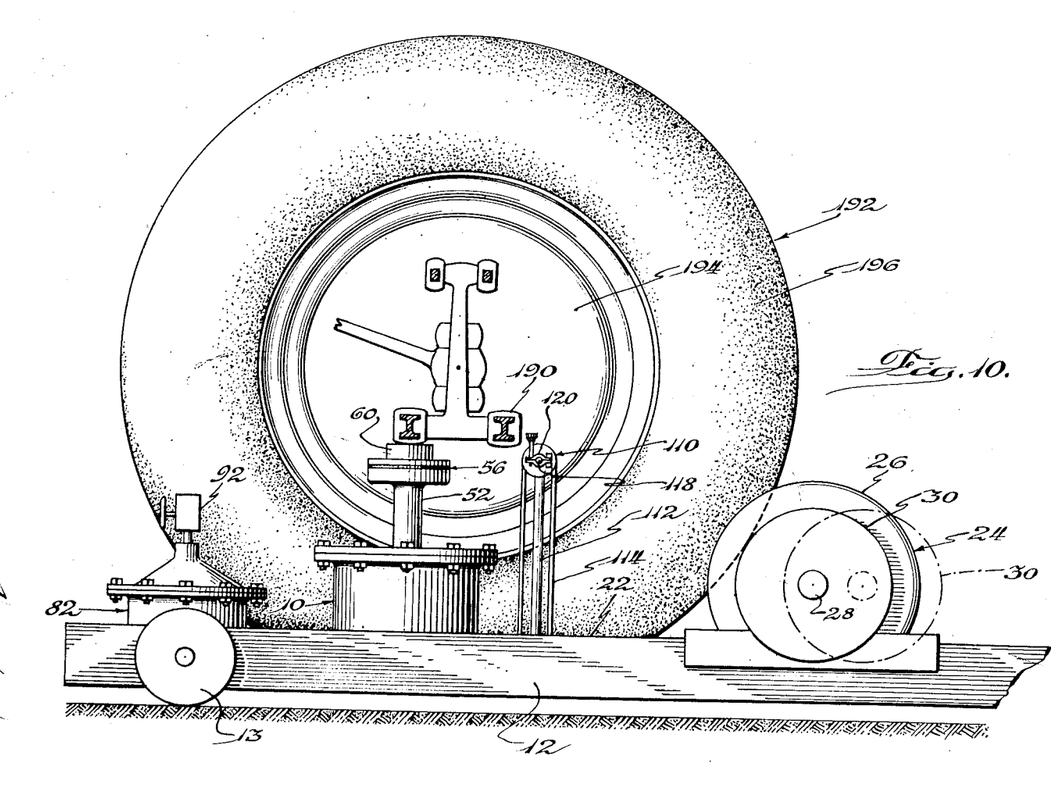
Fig. 10 is a fragmentary partly sectional elevational view of the unit of Fig. 1, illustrating the unit in its normal cooperative relationship with a vehicle wheel during balancing, the view being taken from underneath the vehicle looking toward the inner side of the vehicle wheel.

After these initial preparations, the cart 12 is wheeled under the vehicle (Fig. 10) so that the load supporting head 60 of the jack lines up with some heavy part of the wheel suspension such as a lower control arm 190. The jack head 60 is positioned immediately inside the wheel 192 so that the brake backing disk 194 or some similar member is within reach of the piston rod 118. The jack head 60 is so positioned with respect to the wheel that one of the pulleys 30 may be moved into driving engagement with the vehicle tire 196. The spinner 24 has two pulleys to facilitate balance both left and right-hand vehicle wheels.

Before the vehicle wheel is lifted from the ground, the solenoid valve 90 is opened to permit free flow of hydraulic fluid into the container 82. Opening the valve 90 equalizes the pressure between the inside and the outside of the Bourdon tube 84 so that there is no danger of damaging the tube when the hydraulic pressure in the system is increased to lift the vehicle wheel.

The vehicle wheel may be lifted by starting the pump motor 16, closing the venting valve 68, and opening the admitting valve 66. The pump 14 forces hydraulic fluid through its outlet conduit 40 and the valve 66 into the jack cylinder 48. The vehicle wheel is lifted by the force of the fluid acting on the piston 46. The wheel may be lifted (Fig. 10) until it clears the ground by about an inch. Then the valve 66 may be closed to hold the wheel in this position. The pump 14 may continue to operate since it is constructed to provide only a predetermined maximum pressure.

After the wheel is jacked up, the stand 154 is positioned in front of the wheel so that the shaft 132 lines up approximately with the axis of the wheel. The arms 140 of the tripod 138 are then secured at equally spaced points around the rim of the vehicle wheel. The height and position of the generator 130 may then be adjusted for accurate centering of the shaft 132. During this adjustment the vehicle wheel may be rotated manually to obtain true running of the tripod 138 and the shaft 132.

After these preparations, the spinner 24 is advanced until one of the pulleys 30 engages the tire (Fig. 10) in order to set the wheel into rotation. The spinner is advanced by operating the solenoid valve 74 to admit hydraulic fluid into the piston cylinder 32 from the pump 14. The motor 26 of the spinner is then started and the wheel is driven to a fairly high speed. The spinner is then withdrawn from the wheel by operating the solenoid valve 74 to vent the piston cylinder 32 to the tank 20. The spinner is retracted by the force of the return spring 72. The wheel then rotates freely with gradually decreasing speed. The retracted position of the pulley 30 is indicated in dotted lines in Fig. 10.

If the wheel is out of balance, it is set into vibration by its rotary movement. The vibration components which are vertically directed produce vibratory movements of the diaphragm 56 which supports the load carrying head 60 of the jack 10. The vibrations of the diaphragm produce vibratory pressure waves in the hydraulic fluid. The diaphragm provides means to transmit the vibrations to the hydraulic fluid without loss due to friction between the piston 46 and the piston cylinder. The pressure waves are transmitted to the portion of the piston cylinder 48 below the piston 46 through the axial bore 58 in the jack rod 52. At this time the solenoid valve 90 is closed so that the vibratory pressure waves are applied only to the inside of the Bourdon tube 84. The vibratory pressure variations deflect the Bourdon tube so that the permanent magnet 100 moves back and forth with respect to the pickup coil 102. The rubber ball 94 provides a predetermined amount of elasticity inside the container 82 so that the hydraulic fluid in the container can be displaced slightly by the movements of the Bourdon tube. The hydraulic fluid in the container provides damping upon the Bourdon tube to suppress extraneous resonance effects in the tube.

The movement of the permanent magnet 100, with respect to the coil 102, generates a signal in the coil which corresponds with the vibrations of the vehicle wheel. The magnitude of the signal is indicated by the meter 180 which is connected across the coil 102.

The rotating wheel drives the generator shaft 132 by means of the tripod 138 so that the field magnet 134 rotates while the armature coils 146 remain stationary. A voltage is thereby generated in the coils which corresponds with the instantaneous rotational position of the wheel. By closing the switch 182 the signal from the generator 130 is transmitted through the meter 180.

The frequency of the signal produced by the generator 130 corresponds with the speed of rotation of the vehicle wheel. The vibration signal from the pickup 82 has the same frequency as the signal from the generator because a complete vibration cycle is produced by each revolution of the wheel. Consequently, the signal from the generator 130 will counteract the signal from the vibration pickup 82 if the signals are combined in the proper phase relationship.

The signals from the generator 130 and the vibration pickup 82 are combined and compared by means of the circuit of Fig. 9. It should be understood that the impedance of the meter 180 is small with respect to the impedances of the vibration pickup and the generator, so that the current through the meter is the vector sum of the currents through the generator and the pickup.

The phasing of the signal from the generator 130 may be adjusted by rotating the knob 166. This changes the orientation of the stator 143. With the switch 182 closed, the knob 166 may be rotated to produce a minimum reading on the meter 180. This indicates that the signals from the generator 130 and the pickup 82 are in phase opposition. The position of the stator 143 is then an indication of the location of the unbalanced condition in the vehicle wheel. An indication of the magnitude of the unbalanced condition can be obtained by opening the switch 182 and reading the meter 180 at some definite speed such as 500 r. p. m. The speed is indicated by the tachometer 136.

Alternatively, the stator 143 may be rotated to produce a maximum meter reading, which indicates that the rotation and the vibration signals are in phase.

After these readings have been made the vehicle wheel may be brought to rest. This may be done by engaging the spinner pulley 30 with the wheel and then applying the brake which is incorporated in the spinner motor 26.

After the wheel has been stopped, it is rotated manually to align the pointer 176 with the index mark 178. The unbalanced condition in the wheel is then located at some definite point. For example, the index mark 178 may be so located that the heavy part of the wheel is at the bottom when the pointer 176 is aligned with the mark 178. A corrective weight may then be added to the top of the wheel. The amplitude reading which was taken on the meter 180 gives an indication of the amount of weight necessary to correct the unbalanced condition.

The balancing operation may be repeated as described above until the wheel rotates without producing significant vertically directed vibrations. However, in all probability the wheel will still have horizontally directed vibrations due to "dynamic" unbalance. This type of unbalance produces wobbling of the wheel. To detect the horizontally directed vibrations the appropriate pinch clamp 120 is loosened to unlock one of the piston rods 118 so that the piston rod moves into engagement with the brake-backing plate of the vehicle wheel, under the force of the hydraulic fluid in the piston cylinder 110. The horizontally directed vibrations of the wheel are then transmitted to the hydraulic fluid by means of the piston rod 118 and the piston 116. The vibratory motion of the piston 116 sets up pressure waves in the hydraulic fluid. These vibratory pressure variations are analyzed in the same manner as were the variations produced by the vibration of the diaphragm 56. Briefly stated, the procedure is to close the switch 182 and rotate the armature of the generator 130 until a minimum reading is secured on the meter 180. The position of the generator stator is then indicative of the location of the kinetic unbalance in the vehicle wheel.

The hydraulic jack 10 and the other components of the hydraulic system provide a relatively rigid support for the vehicle wheel so that the vibratory displacement of the wheel is quite small. Consequently, the natural or resonant frequency of the wheel suspension is very high, so that balancing is normally carried on at frequencies far below the resonant frequency. The speed at which the phasing measurement is made is not critical.

Since the balancing apparatus employs a null method for determining the location of the center of unbalance of the wheel, no concern need be given to the absolute phasing of the signals from the pickup and the generator. This fact leads to a balancing system which is dependable and free from complications.

The balancing apparatus incorporates in a single system all of the components which are needed to perform the balancing operation. A supplementary jack is not necessary since the wheel balancer incorporates a device which serves not only as a jack but also as part of a pickup system to detect and measure the vibrations of the wheel. The pickup system is utilized to measure vibrations due to kinetic unbalance as well as vibrations due to dynamic unbalance.

By means of this invention the readings of vibration amplitude and vibration phasing may be made on the same indicating instrument. This convenient arrangement greatly facilitates the operation of the wheel balancer.

Many of the details of the balancing apparatus described above are merely illustrative and should not be taken as limitative. The invention may be practiced by means of many equivalent arrangements. The scope of the invention is indicated by the following claims.

I claim:

1. In an apparatus for balancing a mounted vehicle wheel, a hydraulic jack including a cylinder, a piston in the cylinder, a jack rod carried by the piston and having a chamber at its upper end and a passage connecting the chamber with the cylinder, a diaphragm closing the chamber, means carried by the diaphragm to support vehicle structure, a pressure source connected to force hydraulic fluid into the cylinder for raising the piston, and a fluid pressure responsive vibration pickup connected to the cylinder to produce signals corresponding to vibratory pressure variations therein.

2. In an apparatus for balancing a vehicle wheel, a cart having a plurality of wheels, a hydraulic jack mounted on the cart having a chamber and a member displaceable by hydraulic pressure in the chamber to lift the vehicle wheel, a pressure source carried by the cart and connected to the chamber to force hydraulic fluid into the chamber for lifting the wheel, a vibration pickup connected to the chamber to produce a signal corresponding to vibratory pressure variations in the chamber, a wheel spinner having a drive pulley for rotating the wheel, and means movably mounting the wheel spinner on the cart for moving the pulley into and out of engagement with the wheel.

3. In an apparatus for balancing a vehicle wheel, the combination of a cart having a plurality of wheels, a hydraulic jack mounted on the cart having a hydraulic fluid chamber and a member displaceable by fluid pressure in the chamber to lift the vehicle wheel, a pressure source mounted on the cart and connected to the chamber to force hydraulic fluid into the chamber for lifting the wheel, a vibration pickup on the cart connected to the chamber to produce an electrical signal corresponding to vibratory variations in the hydraulic pressure in the chamber, a wheel spinner movably mounted on the cart for movement into and out of engagement with the vehicle wheel, and a hydraulic cylinder operable by the pressure source to move the spinner.

4. In apparatus for determining unbalance in a mounted vehicle wheel, the combination of a jack including an extendable jacking member and jacking means for extending said jacking member to lift a vehicle wheel clear for free turning movement, means carried by said jacking member defining a compressible fluid sensory cell, a support head mounted for vertical movement by said jacking member and bearing on said sensory cell, a fluid pressure responsive sensory element connected hydraulically to said sensory cell for movement in response to fluid pressure vibrations in said cell induced by vibratory forces transmitted thereto by said support head, an electrical signal generator connected to said pressure responsive sensory element for producing electrical signals synchronized with the vibration of said cell by said support head, rotary unbalance orientation means adapted to be connected with a suspended vehicle wheel for rotation thereby and including means for producing responsive signals synchronized with the rotary movement and the angular position of the wheel, and means for determining the phase relationship between the electric signals of said electrical signal generator and the responsive signals of said orientation means.

5. In apparatus for determining unbalance in a mounted vehicle wheel, the combination of a jack including an extendable jacking member and jacking means for extending said jacking member to lift vehicle structure, means carried by said jacking member defining a compressible sensory cell for liquid, a support head mounted for vertical movement by said jacking member and bearing at least partially on said sensory cell means to apply compressive forces thereto, means forming a plenum chamber, means for connecting said chamber to said sensory cell to initially equalize the fluid pressure therein and then close said plenum chamber after a jacking operation has been completed, a fluid pressure sensory element connected hydraulically with said sensory cell and contained at least partially within said means forming said plenum chamber for exposure to the fluid pressure therein, said plenum chamber means coacting with said pressure sensory element in operation to provide through fluid communication with said sensory cell substantial rigidity of support through said sensory cell means to said support head from said extendable jacking member, and signalling means connected to said pressure sensory element for indicating vibrational forces transmitted to said sensory cell for said support head.

6. In apparatus for determining unbalance in a mounted vehicle wheel, the combination of jacking means including an extendable jacking member and means for extending said jacking member to lift vehicle structure, means carried by said jacking member defining a compressible sensory cell for liquid, a support head mounted for vertical movement by said jacking member and bearing at least partially on said sensory cell, means forming a plenum chamber and including effective volume increasing means having substantial elasticity mounted in association therewith for subjection to force from the internal pressure therein to provide for limited increases in the effective volume of the plenum chamber as an incident to increases in the internal pressure thereof, a sensitive fluid pressure responsive element disposed within said plenum chamber and connected hydraulically with said sensory cell, means for connecting said plenum chamber with said sensory cell to initially equalize the fluid pressures therein and then close off said plenum chamber after a jacking operation has been completed; said sensory cell, pressure responsive element, and plenum chamber thus being included in a substantially rigid hydraulic system; and signal means connected to said sensitive pressure responsive element to respond to vibrational forces imparted to said sensory cell by said support head.

7. Balancing apparatus as set forth in claim 6 in which said plenum chamber volume increasing means having substantial elasticity comprises an elastic, compressible element disposed within said plenum chamber means for exposure to the fluid therein.

8. In apparatus for determining unbalance in a mounted vehicle wheel, the combination of hydraulic jacking means including an expandable jacking chamber and a jacking member extendable upon expansion of said chamber, pumping means connected to said chamber for extending said jacking member to lift vehicle structure, means carried by said jacking member forming a compressible sensory cell for liquid, a support head movable vertically by said jacking member and bearing on said sensory cell, means forming a fluid passageway connecting said sensory cell to said jacking chamber, means forming a plenum chamber, sensitive fluid pressure responsive means positioned for exposure to the pressure of fluid in said plenum chamber and connected hydraulically with said jacking chamber, means for connecting said plenum chamber with said jacking chamber for equalizing the fluid pressure in both chambers, said connecting means last mentioned including means for closing off said plenum chamber after a jacking operation has been completed, and signalling means connected with said pressure responsive means to respond to vibrational forces imparted to said sensory cell by said support head.

9. In apparatus for determining unbalance in a mounted vehicle wheel, the combination of a hydraulic jack including an expandable jacking chamber and a jacking member extendable upon expansion of said chamber, pumping means connected to said jacking chamber, means carried by said jacking member forming a compressible sensory cell for liquid, a support head mounted for generally vertical movement by said jacking member and bearing at least partially on said sensory cell, means defining a passageway connecting said cell with said jacking chamber, means forming a plenum chamber, an elastically compressible variable volume element in said plenum chamber, a Bourdon tube disposed in said plenum chamber and connected hydraulically with said jacking chamber, means for connecting said plenum chamber with said jacking chamber for equalization of fluid pressures therein, said connecting means last mentioned including means for closing said plenum chamber after a jacking operation, and a sensitive electric signal generator connected to said Bourdon tube to produce electrical signals in response to vibratory forces imparted to said sensory cell by said support head.

10. In apparatus for determining unbalance in a mounted vehicle wheel, the combination of a base, a hydraulic jack mounted on said base and including a jacking member, a pump supported on said base and connected to said jack for supplying fluid under pressure thereto for extending said jack to raise vehicle structure, means carried by said jacking member forming a compressible sensory cell for liquid, a support head mounted for generally vertical movement by said jacking member and bearing at least partially on said sensory cell, means on said base forming a plenum chamber, sensitive pressure responsive means positioned for exposure to the pressure of fluid in said plenum chamber and connected hydraulically with said sensory cell, means for connecting said plenum chamber with said sensory cell to permit an equalization of fluid pressures therein, said connecting means last mentioned including means for closing off said plenum chamber after a jacking operation, signal means connected to said pressure responsive means to respond to vibrational forces imparted to said sensory cell by said support head, and a spinner mounted on said base to rotate a vehicle wheel suspended by said support head.

11. In apparatus for determining unbalance in a mounted vehicle wheel, the combination of a wheeled support, a hydraulic jack mounted on said support and including an extendable jacking member, pumping means mounted on said support for supplying fluid under pressure to said hydraulic jack, means carried by said jacking member defining a sensory cell for liquid, a support head mounted for generally vertical movement by said jacking member and bearing at least partially on said sensory cell, means on said support defining a second compressible sensory cell for liquid, a horizontal connecting member extending laterally from said second cell to transmit thereto lateral vibrational forces of a vehicle wheel supported on said head, means on said support forming a plenum chamber, sensitive pressure responsive means disposed in position for exposure to the pressure of fluid in said plenum chamber and connected hydraulically with said first and second sensory cells, means for connecting said plenum chamber hydraulically with said two sensory cells to permit an equalization of fluid pressures therebetween, said connecting means last mentioned including means for closing said plenum chamber after a jacking operation, and signal means connected to said pressure responsive element to respond to vibrational forces imparted to either of said sensory cells.

12. In apparatus for determining unbalance in a mounted vehicle wheel, the combination of a hydraulic jack including an expandable jacking chamber and a jacking member extendable upon expansion of said chamber, pumping means for supplying fluid under pressure to said jacking chamber, means including a support head on said jacking member for supporting vehicle structure thereon and for transmitting vibrational forces of the supported structure through said jacking member to fluid within said jacking chamber, means forming a plenum chamber, a sensitive fluid pressure responsive device mounted in said plenum chamber and connected hydraulically with said jacking chamber, means for connecting said plenum chamber with said jacking chamber to equalize the fluid pressures therein, said connecting means last mentioned including means for closing off said plenum chamber from said jacking chamber after a jacking operation, and electric signalling means connected to said fluid pressure responsive device to produce signals in response to pressure vibrations of fluid within said jacking chamber.

13. In apparatus for determining unbalance in a mounted vehicle wheel, the combination of a jack including an extendable jacking member and jacking means for extending said jacking member, means carried by said jacking member defining a compressible sensory cell for liquid, a support head mounted for vertical movement by said jacking member and bearing at least partially on said sensory cell means to apply compressive forces thereto, said support head being adapted to support vehicle structure thereon for lifting as an incident to extension of said jacking member, a movable fluid pressure responsive sensory element connected hydraulically to said sensory cell for movement in response to fluid pressure vibrations in said cell induced by vibratory forces transmitted thereto by said support head, rotary unbalance orientation means adapted to be connected with a suspended vehicle wheel for rotation thereby and including means for producing an electric signal synchronizing with the rotary movement and the angular position of the wheel, electrical vibration sensing means connected to said pressure responsive sensory element for actuation thereby and including electrical generator means for producing cyclic electrical signals synchronized with the vibration of said cell by said support head, and means coacting with said vibration sensing means and said unbalance orientation means for determining the phase relationship between the electrical signals of said orientation means and the electrical signals of said electrical vibration sensing means.

14. In apparatus for determining unbalance in a mounted vehicle wheel, the combination of a jack including an extendable jacking member and jacking means for extending the jacking member, means carried by said jacking member defining a compressible sensory cell for liquid, a support head for vehicle structure mounted for vertical movement by said jacking member and bearing at least partially on said sensory cell means to apply compressive forces thereto generally proportional to the load supported by the head, rotary unbalance orientation means including means adapted for connection to a suspended vehicle wheel for rotation thereby and including electrical means for producing cyclic electric signals synchronized with the rotary movement and the angular position of the wheel, said unbalance orientation means including means for shifting the phase relationship between the electrical output signals of the electrical means thereof and said means thereof adapted for connection to a vehicle wheel, a movable fluid pressure responsive element connected hydraulically to said sensory cell for movement in response to fluid pressure vibrations in said cell induced by vibratory forces transmitted thereto by said support head, electrical vibration sensing means connected to said pressure responsive element and including electrical means for producing electrical signals synchronized with the vibration of said cell by said support head, and electrical means connected with the unbalance orientation means and with said vibration sensing means for determining the intensity of the output signals of the latter and detecting convergence and divergence in the phase relationship between the output signals of said unbalance orientation means and said vibration sensing means.

References Cited in the file of this patent

UNITED STATES PATENTS

| | | |
|---|---|---|
| 2,131,602 | Thearle | Sept. 27, 1938 |
| 2,139,509 | Marcellus | Dec. 6, 1938 |
| 2,341,443 | Hunter | Feb. 8, 1944 |
| 2,341,444 | Hunter | Feb. 8, 1944 |
| 2,361,349 | Frazier | Oct. 24, 1944 |
| 2,361,990 | Brown | Nov. 7, 1944 |
| 2,363,373 | Werner | Nov. 21, 1944 |
| 2,383,405 | Merrill et al. | Aug. 21, 1945 |
| 2,420,910 | Richards | May 20, 1947 |
| 2,486,277 | Hagg et al. | Oct. 25, 1949 |
| 2,534,918 | Kroft et al. | Dec. 19, 1950 |
| 2,631,272 | Smith | Mar. 10, 1953 |
| 2,636,386 | Schultheis et al. | Apr. 28, 1953 |

FOREIGN PATENTS

| | | |
|---|---|---|
| 675,689 | France | Nov. 8, 1929 |
| 681,932 | France | Feb. 4, 1930 |
| 587,353 | Great Britain | Apr. 23, 1947 |